United States Patent
Wienand et al.

[11] Patent Number: 6,082,609
[45] Date of Patent: *Jul. 4, 2000

[54] PROCESS FOR PRODUCING A SENSOR ARRANGEMENT FOR MEASURING TEMPERATURE

[75] Inventors: Karlheinz Wienand, Aschaffenburg; Eva Söll, Frankfurt; Matthias Muziol, Heusenstamm, all of Germany

[73] Assignee: Heraeus Electro-Nite International N.V., Houthalen, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/861,843

[22] Filed: May 22, 1997

[30] Foreign Application Priority Data

May 24, 1996 [DE] Germany .......................... 196 21 001

[51] Int. Cl.[7] .......................... B23K 31/02; B23K 31/00; H01C 7/02; H01C 17/06
[52] U.S. Cl. ......................... 228/122.1; 228/248.1; 29/612; 29/620
[58] Field of Search ............ 228/248.1, 180.22, 228/224, 122.1; 29/612

[56] References Cited

U.S. PATENT DOCUMENTS

| | | |
|---|---|---|
| 3,818,415 | 6/1974 | Evans et al. .......................... 339/17 F |
| 4,031,272 | 6/1977 | Khanna ........................ 427/96 |
| 4,375,056 | 2/1983 | Baxter et al. ........................ 338/25 |
| 4,447,799 | 5/1984 | Carlson ................. 338/22 R |
| 4,547,436 | 10/1985 | Rellick . |
| 4,567,110 | 1/1986 | Jarvinen . |

(List continued on next page.)

FOREIGN PATENT DOCUMENTS

| | | |
|---|---|---|
| 855 627 | 11/1952 | Germany . |
| 1 681 483 | 8/1954 | Germany . |
| 1 713 442 | 12/1955 | Germany . |
| 1 784 455 | 3/1959 | Germany . |
| 1 808 504 | 3/1960 | Germany . |
| 1 855 262 | 7/1962 | Germany . |
| 3424 387 A1 | 1/1986 | Germany . |
| 3424387 A1 | 1/1986 | Germany . |

(List continued on next page.)

OTHER PUBLICATIONS

Yoshiki (Patent Abstracts of Japan) Electronic Clinical Thermometer and Manufacture Thereof May 11, 1985 #60082824.
Hajime (Patent Abstracts of Japan) Manufacture of Hybrid Integrated Circuit Device Sep. 21, 1983 #58158980.
Bargel and Schulz, *Werkstofftechnik*, p. 88.
Hawley, Gessner G. (ed.), The Condensed Chemical Dictionary, 10th ed., pp. 147 and 957. (1981).

*Primary Examiner*—Patrick Ryan
*Assistant Examiner*—Kiley Stoner
*Attorney, Agent, or Firm*—Akin, Gump, Strauss, Hauer & Feld, L.L.P.

[57] ABSTRACT

A process is provided for producing a sensor arrangement for measuring temperature with a temperature-sensitive measuring resistance element which has a thin, metallic resistance layer electrically-insulated toward the outside on a ceramic substrate and free-lying contact surfaces, which are connected electrically-conducting and directly mechanically fast with high-temperature-resistant conductor strips, electrically insulated from one another, on a ceramic board. The measuring resistance element is bonded and fastened on one end of the board by laying it on a still moist thick-film conducting paste printed on immediately before outfitting on the board and subsequently burning it in. On the end of the board away from the measuring resistance element, contact surfaces for connection of a plug or cable are arranged. The temperature sensor, a standard component in the form of a flat measuring resistance element, is applied wirelessly as an SMD component on the ceramic board. The sensor arrangement manufactured with the process is suited for temperature measurements above 400° C. as well. The process is economical in using only a few standardized components and easily automatable process steps.

3 Claims, 3 Drawing Sheets

U.S. PATENT DOCUMENTS

| | | | |
|---|---|---|---|
| 4,843,190 | 6/1989 | Verhoeven | 174/68.5 |
| 5,033,666 | 7/1991 | Keusseyan et al. | 228/122 |
| 5,248,079 | 9/1993 | Li | 228/121 |
| 5,252,219 | 10/1993 | Nakatani et al. | 437/209 |
| 5,252,519 | 10/1993 | Nakatani et al. | 437/209 |
| 5,400,953 | 3/1995 | Maeno | 228/248.1 |
| 5,494,562 | 2/1996 | Maley et al. | 204/403 |

FOREIGN PATENT DOCUMENTS

| | | |
|---|---|---|
| 87 16 103 U | 3/1988 | Germany . |
| 39 39 165 C1 | 10/1990 | Germany . |
| 40 25 715 | 4/1992 | Germany . |
| 295 04 105 U | 6/1995 | Germany . |
| 44 24 630 C1 | 9/1995 | Germany . |
| 41 18 466 | 12/1995 | Germany . |
| 2 186 577 U | 8/1987 | United Kingdom . |

PROCESS FOR PRODUCING A SENSOR ARRANGEMENT FOR MEASURING TEMPERATURE

BACKGROUND OF THE INVENTION

The invention concerns a process for producing a sensor arrangement for measuring temperature, comprising a temperature-sensitive measuring resistance element which has a thin metal film as a resistance layer and contact surfaces on a ceramic substrate, wherein the resistance layer is covered by an electrically insulating protective layer, the contact surfaces, however, conduct electricity and are directly connected, mechanically fast, with conductor strips which are electrically insulated from one another on a high temperature-stable board, whereby the measuring resistance element at one end of the board is allocated contact surfaces for connection of a plug or cable.

For example, substrates or boards as carriers for passive or active structural elements are sufficiently known from German Patent DE 39 39 165 C 1 or German Utility Model DG 87 16 103 U1. Since most component parts find applications in temperatures ranging up to a maximum of 150° C., the board material is usually designed only for this temperature range. As a rule, it is a matter of plastics which are often reinforced with inorganic materials. To the extent that a wireless bonding of the component parts is provided, as this is, for example, customary even for temperature measuring resistance elements for application as calorimetry sensors (German Patent DE 44 24 630 C1), this takes place through soft soldering and/or by means of conductive adhesives. These connection techniques on plastic boards are, however, completely unsuited for temperatures above 300° C.

A sensor arrangement, likewise for calorimetry, is known from German Utility Model DE 295 04 105 U1, in connection with which a short (15 mm long) ceramic thin layer is used as the board. Since here use as a calorimetric sensor is indicated, one must proceed from the assumption that bonding by means of soft solder is provided. In order to guarantee a flawless bonding with a soft solder, this requires on the one hand a measuring resistance element with previously tin plated contact surfaces, and in addition several process steps: 1. Printing the board with a soldering paste; 2. "Reflow" burn-in of the soldering paste; 3. Placing the measuring resistance element on the soldering pads of the board for which an SMD adhesive is recommended for fixing the position; and 4. "Reflow" burning-in for connecting and melting the soldering pads. Aside from the fact that soft soldering is only suited for operating temperatures of 300° C. at the highest, the procedure is characterized by many individual steps which make manufacture relatively expensive.

Further procedures for producing sensor arrangements with temperature measuring resistance elements for high temperature use according to the state of the art (documented for example in German Utility Models DGm 1 681 483, DGm 1 713 442, DGm 1 784 455, DGm 1 808 504, DGm 1 855 262, and German Patent 855 627) are so designed that, first of all, the connecting wires of the measuring resistance element are extended by electrically insulated connecting wires of the connecting cable. The connection of the quite thin connecting wires of the measuring resistance element to the usually thicker connecting wire of the lead is created by welding or hard soldering. If a fiberglass-coated lead is used, the insulation must first be stripped off. In order to rule out a short circuit during the operating state, however, some sort of an electrical insulation must be provided for the connecting wires of the measuring resistance element and for the region of the welding or hard soldering connection. Moreover, the connecting wires must be relieved of stress either by sealing material or by special ceramic shaped parts (see DGm 1 855 262). The electrical insulation of the connecting cable for high temperature use may be fulfilled by ceramic capillary tubes, which, however, entail a large proportion of the overall material costs and which, on account of their geometric dimensions, often stand in the way of a miniaturization. Alternatively, the insulation may be guaranteed by fiberglass jackets which are stiffened for production-related reasons by an organic impregnation. This impregnation must be removed in an extra annealing process. In addition, it is customary in fixing the position of the measuring resistance element to introduce a ceramic adhesive into the tip of the measuring insert protection tube. A high temperature measuring insert is therefore produced according to the state of the art with a multitude of individual components and process steps, which either cannot be automated, or can only be automated at great expense.

SUMMARY OF THE INVENTION

In contrast, underlying the invention is the objective of creating a process for producing a sensor arrangement, which consists of a few standardized individual steps, and which is economical owing to easily automatable procedural steps from SMD (surface mounted device) technology. The sensor arrangement should be suited for temperature measurement above about 400° C.

The object is accomplished in accordance with the invention for the process of producing a sensor arrangement for measuring temperature by applying a still moist thick film conducting paste to the board on which the measuring resistance element with its free contact surfaces is placed on the contact surface for bonding and fastening the planar temperature-dependent measuring resistance element immediately before laying the measuring resistance element on the high temperature-resistant, electrically insulated board provided for this, and by burning the film in on the board at temperatures up to 1000° C. so that it is bonded and fastened.

Applying the paste can take place by screen printing or by brush application, for example. The measuring resistance element is subsequently bonded with the so-called flip-chip technique. That is, it is placed with its free contact surfaces ("face down") on the appropriate contact surfaces of the carrier board, which have been prepared with the moist thick film conducting paste and burned-in at temperatures up to about 1000° C. Additional aids for fixing the position are not necessary in the process of the invention, since the moist, viscous, thick-film, conducting paste imprinted in the screen printing process has an almost rectangular profile, so that in contrast with the spherical surface of soldering pads, the flat measuring resistance element remains in position after being placed thereon. This process requires fewer individual steps and can easily be automated.

For contact surfaces for bonding the measuring resistance element, thick layer pastes of Au, AgPd, AgPt, Pt have proven themselves as uppermost contact-forming layers. Since the measuring resistance element is frequently equipped with gold contact surfaces as a standard component, the use of a gold paste on the ceramic board suggests itself, since burning-in temperatures (in a conventional transit oven) of approximately 850° C. are quite sufficient.

The outfitting of the preferably ceramic board prepared with conductor strips and contact surfaces, preferably takes place as a multiple unit with SMD automatic placement systems. Immediately prior to feeding into the automatic placement systems, the contact surfaces for the measuring resistance element are printed in the screen printing process with a thick film conducting paste. The measuring resistance element is laid on these still moist contact pads such that its contact surfaces cover the moist contact surfaces on the board. The outfitted boards are subsequently dried and burned-in in a transit oven. In this way, a mechanical fastening of the measuring resistance element on the board over the contact surface is attained, and the electrical connection between measuring resistance element and the leads on the board is also produced. In connection with this, the multiple unit is separated, which can take place by breaking along previously scribed lines on the board units or by sawing or by lasers. With the appropriate layout construction, the measuring resistance elements can also be set up in a linear multiple unit on the board multiple unit. In this case, the measuring resistance elements are then separated together with the boards. Through an electrical continuity test, appropriately prior to the separation of the outfitted boards, defective or not fully functional sensor arrangements can be determined and, if need be, sorted out. For completing a measuring insert, one now requires only two additional parts besides the main piece of the outfitted board, namely a protective tube and a plug or cable connection. The assembly of these parts is easily possible with very economical fabrication techniques. The described production process permits a high degree of automation throughout.

The sensor arrangement produced by the process of the invention can have the following construction features:

At least two conductor strips lead from the measuring resistance element, which bridges the contact surfaces, to the other end of the elongated board, where a further pair of contact surfaces for the plug or cable connection is located. Ceramic, glass, glass ceramic or a metal electrically insulated on its surface come into consideration as high temperature-resistant materials for the board, for which aluminum oxide ($Al_2O_3$) has proven itself as a usual substrate material for thick or thin film circuits. In addition to this, however, other oxide ceramic or non-oxide ceramic materials, as well as a wide range of glasses and glass ceramics, are suitable to the extent that they meet the requirements of the respective temperature range (800° C. in continuous operation, short term up to 1000° C.) and are unaffected by temperature change. Temperature changes are to be taken into consideration in so far as a sensor arrangement of the invention is used, for example, for monitoring the temperature of a pyrolytic cleaning process in household ovens, which cyclically transpires at about 550° C. and which can be terminated or interrupted by forced cooling. Monitoring cooking operations represents a similar application where extreme temperature changes can also occur. The maximum temperature here amounts to 750° C. The material for the conductor strips and the contact surfaces, which are applied in thin film and/or thick film technology to the preferably ceramic board, must likewise conform to the requirements described. The structuring possibilities of thick and thin film technology permit an economical application of the simple circuit diagrams in the multiple unit, wherein metalizing (and outfitting) can take place in one operation with a substrate surface of about 100×100 mm to produce up to 35 boards of 100×2.5 mm in size.

The contact surfaces for the plug and cable connection at the "cold" end of the board should, according to which bonding technique is selected, be scratch-resistant and/or solderable. For a solder connection, contact surfaces of silver or silver/palladium can particularly be considered. Should a contact merely be inserted, a gold contact surface can be appropriate.

If an especially narrow construction of the sensor arrangement is required for a particular mounting position, the ceramic board can be reduced to a width of about 1 mm. In this case, one will no longer accommodate the two conductor strips and the contact surfaces for the plug or cable connection on one side of the board, but will install a conductor strips and a plug contact surface on the reverse side of the board. By means of a through-bonded boring through the board in the area of the measuring resistance element to be bonded, the connection of the reverse side lead conductor strip to the corresponding contact surface for the measuring resistance element strip produced.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The process of the invention includes the following sequence of operations, for example:

An aluminum oxide substrate with dimensions of 101.6× 101.6×0.6 mm (a 4×4 inch standard substrate) has parallel laser scribings at a distance of 2.5 mm. On one side of the substrate, two conductor strips each are applied in the strips provided by the laser scribing. These conductor strips are applied and structured in a thick or thin layer process. They basically comprise Ag or AgPd or Pt or Au. This ceramic board thus prepared is secured in the mounting device of a screen printing facility. By means of an appropriately dimensioned printing screen, gold contact surfaces are printed on the end of the conductor strips where the temperature-sensitive measuring resistance element is to be placed. The distances and shapes of these contact surfaces are guided by the dimensions of the measuring resistance element to be mounted. For a measuring resistance element of 8×2 mm in size, the two contact surfaces set at a distance of 5 mm have dimensions of approximately 2.5×1.5 mm. As a thick film paste, the "C 5010" gold paste of W. C. Heraeus GmbH is used, for example. The ceramic board thus provided with moist gold pads is removed from the screen printing device and fed into an SMD automatic placement system, as for example a so-called pick and place machine. Here, the measuring resistance element is laid, as a rule "face down," on the still moist gold pads of the board. A drying subsequently takes place, either in a drying cabinet or already in the drying zone in the inflow area of a transit oven in which the burning-in is also conducted. For the burning-in, a standard burn-in profile can be selected, which has a speed of 80 mm/min with a peak temperature of 800° C. for 5 minutes as a characteristic value for the gold paste mentioned. The total transit time amounts to 45 minutes. With this procedure, the measuring resistance elements are fastened to the ceramic boards and electrically bonded. There follow test and examination steps, as well as unitizing of the outfitted board strips from the multiple unit by a breaking device.

Figure 1:
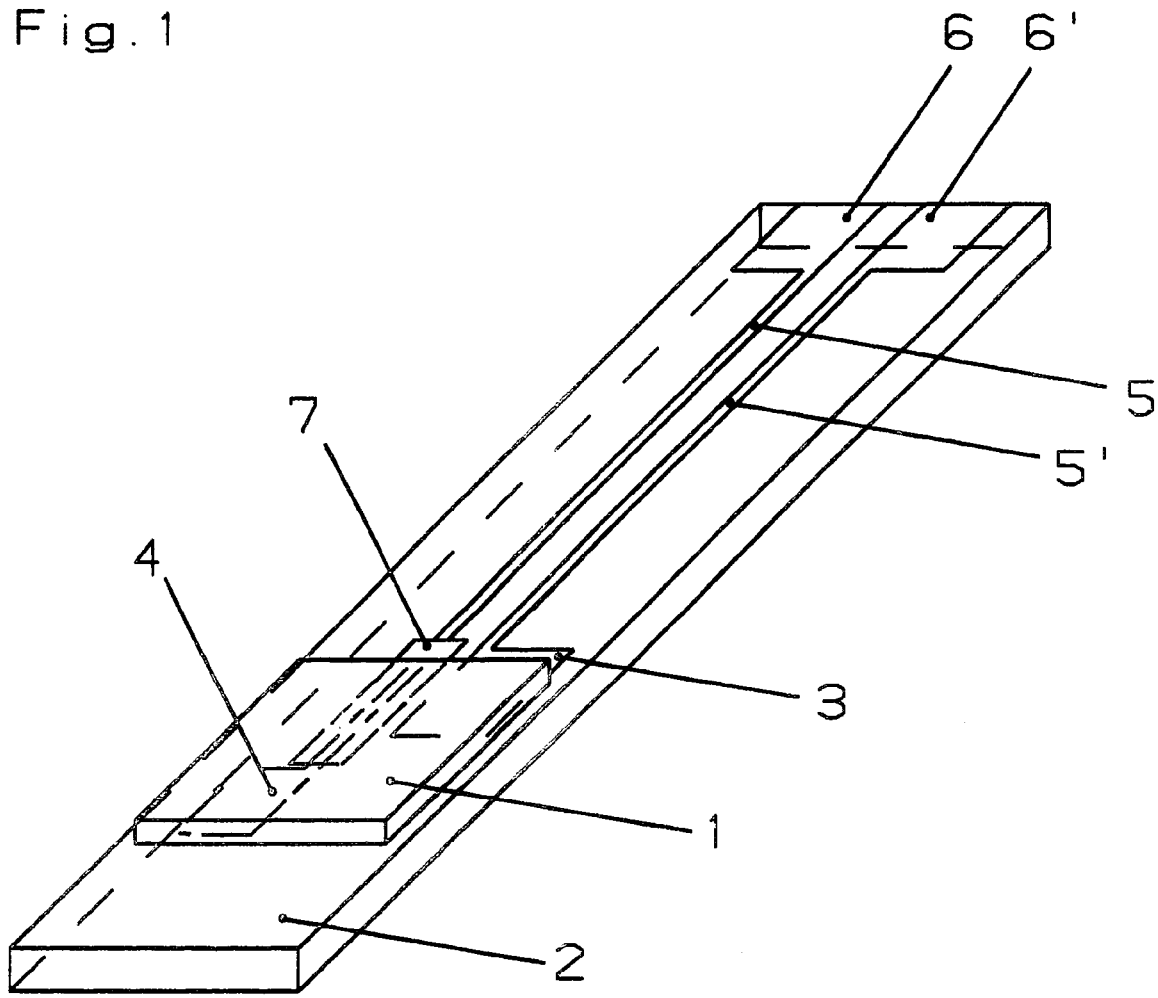
FIG. 1 depicts a sensor arrangement on a ceramic board.

An embodiment of the sensor arrangement for temperature measurement produced with the process of the invention is represented in FIG. 1. The flat measuring resistance element 1 is laid on one end of the ceramic board 2. The contact surfaces 3, 4 of the board 2 correspond in their shapes and distances to those of the measuring resistance element 1 which is fastened and bonded by a fixation burn-in using the freshly applied thick film conducting paste (for example, a gold paste). The conductor strips 5, 5' run parallel next to each other to the cold end of the ceramic board 2, where they terminate in contact surfaces 6, 6' for the plug or cable connection. The conductor path material can be Au, AgPt, Pt or AgPd, for example. The uppermost layer 3, 4, 6, 6' of the contact surfaces preferably comprises of an Au thick film paste. With increased requirements regarding high voltage stability, it can be advisable to cover the conductor strips 5, 5' with a dielectric. Moreover, in order to rule out shunts on the measuring resistance element 1, it is advantageous (as can be recognized from FIG. 1) to insulate the conductor path 5, which runs further to the tip of the carrier board and there terminates in a contact pad for the measuring resistance element, with a covering layer 7 at least in the area in which the conductor path touches the flat measuring resistance element lying on it. Nominal resistances for this component can be, for example, 100, 500 or 1000 ohm, depending on what the customer-specific application provides. Typical dimensions for the described carrier board 2 are: Length 100 mm, width 3 mm, thickness 1 mm.

Figure 2:
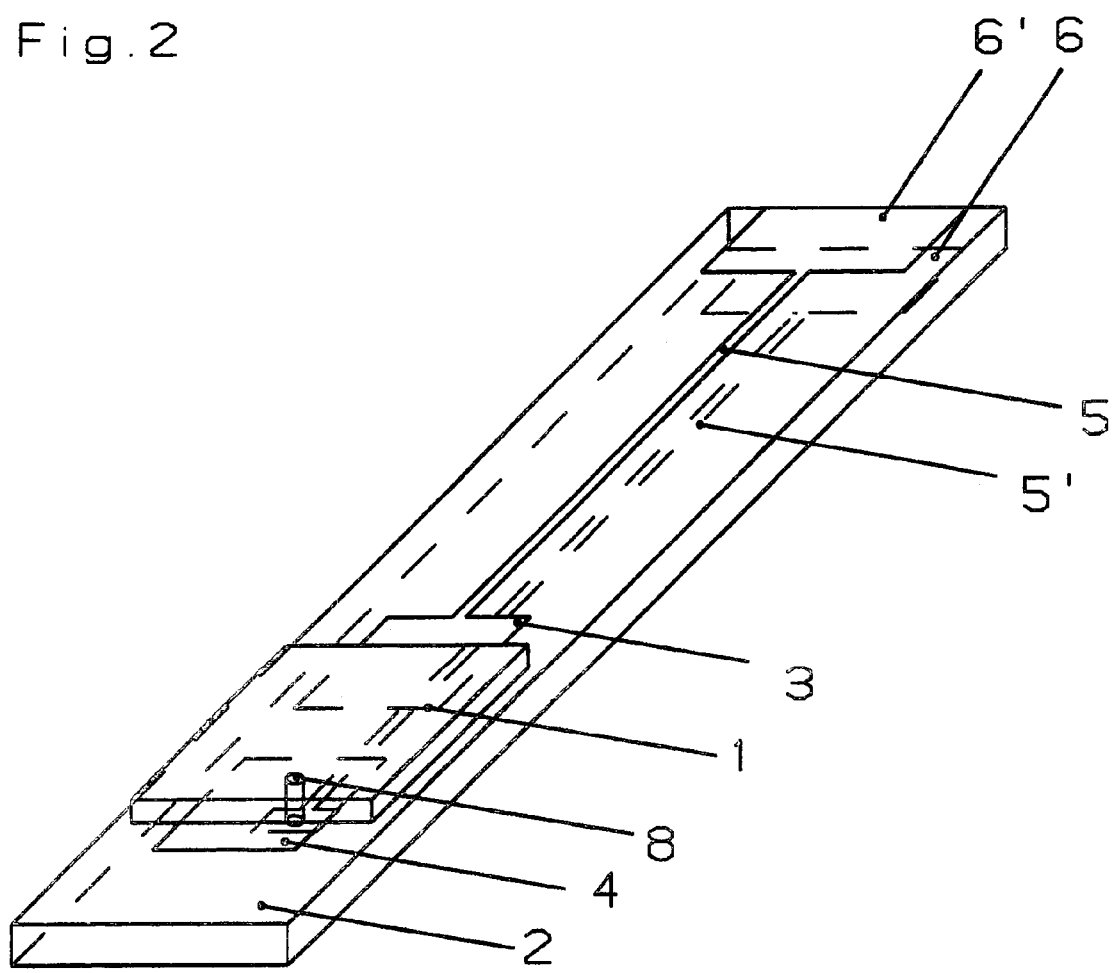
FIG. 2 shows sensor arrangement on a ceramic board with a through bonding.

FIG. 2 differs from FIG. 1 mainly in the arrangement of the two conductor strips 5, 5' and the respective plug contact surfaces 6, 6'. These are arranged not on one side of the board, but on the front and reverse sides of the ceramic carrier board 2. Both contact surfaces 3, 4 for the flat measuring resistance element 1 are, however, as in the first example, on one side of the board 2, whereby the connection to the conductor strip 5 on the reverse side is guaranteed through a through-bonded bore 8. The through-bonded bore 8 lies in the area of the second contact surface 4 for the measuring resistance element. An insulating covering layer for the area of the board 2 covered by the measuring resistance element 1 is not necessary here. In addition, this construction makes possible, an especially narrow sensor arrangement which typically has the following dimensions: For the carrier board 2: 100×1×1 mm; for the flat measuring resistance element 1: 5×1×0.4 mm.

Figure 3:
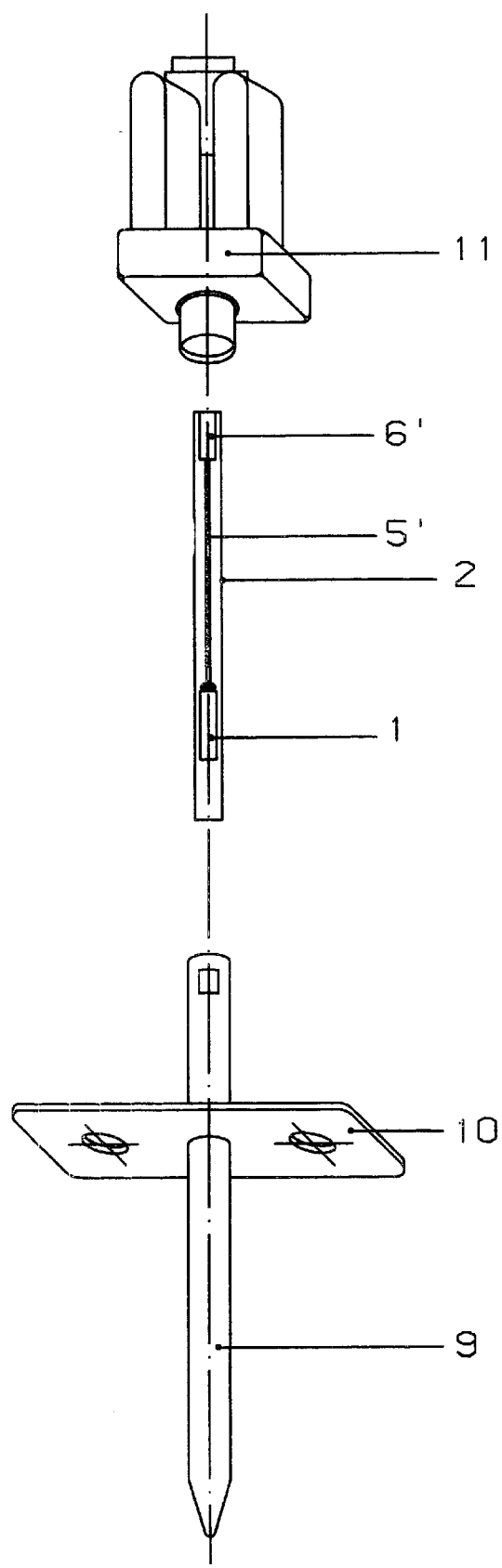
FIG. 3 shows an exploded view of a temperature measurement insert.

The construction of a temperature measuring insert with a temperature sensor 1 on a ceramic carrier board 2 is represented in FIG. 3. In this example, the carrier board 2 from FIG. 2 is used. It is slid into a metal protective tube 9, closed on one end, which has a stop collar 10 for screwing together with a housing element. At the "cold" end, a plug is placed against the plug contact surfaces 6, 6' of the carrier board 2. The plug 11 at the same time serves as the locking element for the metal protective tube 9.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing a sensor arrangement for measuring temperature, wherein the sensor arrangement comprises a temperature-sensitive measuring resistance element which has a thin metal film as a resistance layer and two or more first contact surfaces on a ceramic substrate, wherein the resistance layer is covered by an electrically insulating protective layer, and the contact surfaces are mechanically connected in an electrically-conductive manner to conductor strips, which are electrically insulated from one another on a high temperature-resistant board, and wherein the measuring resistance element is bonded on one end of the board, and on an end of the board away from the measuring resistance element are arranged two or more second contact surfaces for connecting a plug or a cable, said process comprising applying a moist thick-film conducting paste upon the two or more contact surfaces (3, 4) for bonding and fastening the measuring resistance element (1) immediately before laying the measuring resistance element (1) on the high temperature-resistance board (2), laying the measuring resistance element (1) on the two or more contact surfaces on the board (2) while the paste is still moist, and burning-in the paste at temperatures from about 800° C. to about 1000° C. on the board (2), whereby the measuring resistance element (1) is bonded and fastened to the board (2).

2. The process for producing a sensor arrangement for temperature measurement according to claim 1, wherein the thick-film conducting paste for bonding the measuring resistance element (1) on the board (2) contains conducting metal selected from the group consisting of Au, AgPd, AgPt and Pt.

3. A process for producing a sensor arrangement for measuring temperature, wherein the sensor arrangement comprises a temperature sensitive measuring resistance element which has a thin metal film as a resistance layer and two or more first contact surfaces on a ceramic substrate, wherein the resistance layer is covered by an electrically insulating protecting layer, and the contact surfaces are mechanically connected in an electrically-conductive manner to conductor strips, which are electrically insulated from one another on a high temperature-resistant board, and wherein the measuring resistance element is bonded on one end of the board, and on an end of the board away from the measuring resistance element are arranged two or more second contact surfaces for connecting a plug or a cable, said process comprising printing a moist thick-film conducting paste, said paste containing at least one conducting metal selected from the group consisting of Au, AgPd, AgPt and Pt, upon the two or more first contact surfaces (3, 4) for bonding and fastening the measuring resistance element (1) immediately before laying the measuring resistance element (1) on the high temperature-resistant board (2), laying the measuring resistance element (1) on the two or more contact surfaces on the board (2) while the paste is still moist, and burning-in the paste at temperatures from about 800° C. to about 1000° C. on the board (2) whereby the measuring resistance element (1) is bonded and fastened to the board (2).

* * * * *